March 24, 1959  E. T. CARLSON ET AL  2,879,319
BUS DUCT SYSTEM

Filed July 23, 1956  3 Sheets-Sheet 1

INVENTORS
Elmer T. Carlson
Arthur R. Constantine
BY
ATTORNEYS

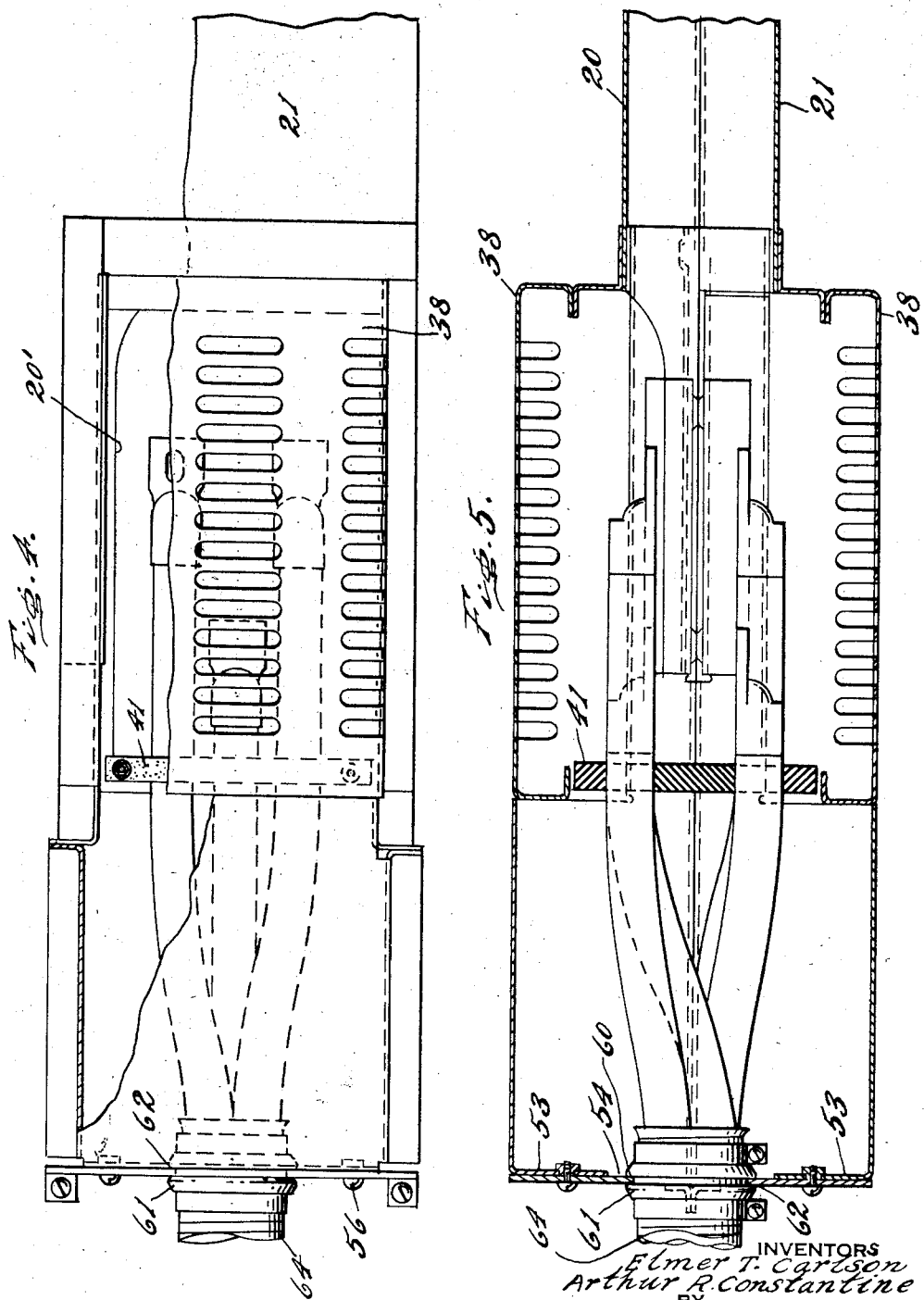

March 24, 1959 E. T. CARLSON ET AL 2,879,319
BUS DUCT SYSTEM
Filed July 23, 1956 3 Sheets-Sheet 3

INVENTORS
Elmer T. Carlson
Arthur R. Constantine
BY
ATTORNEYS.

United States Patent Office 2,879,319
Patented Mar. 24, 1959

2,879,319

BUS DUCT SYSTEM

Elmer T. Carlson, Centre Valley, Pa., and Arthur R. Constantine, Longmeadow, Mass., assignors to Electric Distribution Products, Inc., Allentown, Pa., a corporation of Delaware Application July 23, 1956, Serial No. 599,629

7 Claims. (Cl. 174—70)

The present invention relates to bus duct systems and particularly to connectors between one line of bus duct and another.

The present invention is a further development of the subject matter of our copending applications Serial No. 466,466, filed November 3, 1954, for Electrical Distribution System, now United States Patent No. 2,786,908, granted March 26, 1957; Serial No. 466,467, filed November 3, 1954, for Electrical Distribution System; Serial No. 558,028, filed January 9, 1956, for Electrical Distribution System; and Serial No. 558,029, filed January 9, 1956, now Patent No. 2,825,775, for Electrical Distribution System.

A purpose of the invention is to avoid the necessity for producing a wide selection of bus duct angles, elbows at various angular relationship, offset connections and the like which have heretofore been needed to connect one bus duct line to another.

A further purpose is to simplify arrangements for taking up expansion in long bus ducts.

A further purpose is to permit a high degree of adaptability, along with good production, in connecting one bus duct line to another.

A further purpose is to utilize flexible hoses for interconnecting bus duct lines, to employ a plurality of such hoses, and to permit bending of the hoses endwise or sidewise as required.

A further purpose is to carry one conductor of each phase through each of a plurality of interconnecting metallic hoses.

A further purpose is to hold flexible metallic conductors by an insulating barrier in an attachment box which serves to insulate and mechanically clamp and press the conductors against damage in case of a fault.

A further purpose is to secure the ends of flexible metallic hoses by hose clamps having slots which are engaged and clamped by opposed junction plates.

A further purpose is to permit making a bend or turn in several stages using straight bus duct sections between curving flexible metallic hose units.

A further purpose is to allow flexible metallic hose units to connect from bus ducts to switch boards and the like.

Further purposes appear in the specification and in the claims.

In the drawings we have chosen to illustrate a few only of the numerous embodiments in which our invention may appear, selecting the forms shown from the standpoints of convenience in illustration, satisfactory operation and clear demonstration of the principles involved.

Figure 4 is a fragmentary side elevation illustrating the end of a bus duct section and the connection box.

Figure 5 is an edge elevation partly in central section illustrating the bus duct and connection box.

Figure 1:
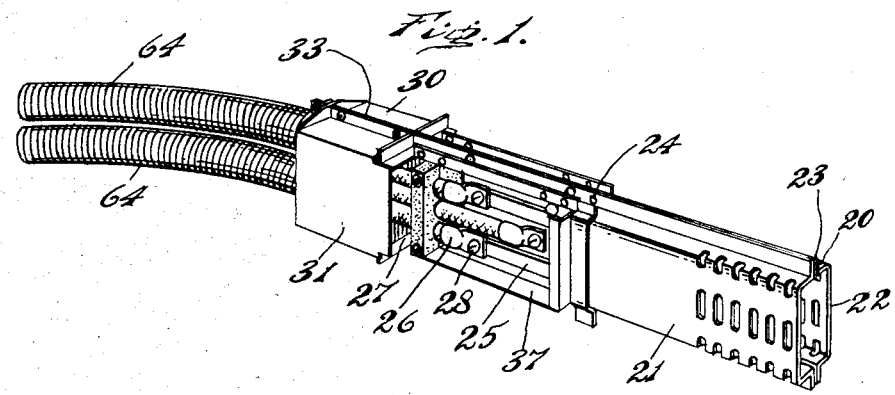
Figure 1 is a fragmentary perspective useful in explaining the invention.

One of the difficulties encountered in prior art bus duct systems is that a wide variety of end connectors have been necessary. It will be appreciated that lines of bus duct are likely to intersect not only at right angles, but at a wide variety of other angles. Bus ducts in some cases are placed with the major dimension of the housing horizontal and in other cases with the major dimension of the housing vertical and different types of end connectors have been required in the past for the respective positions.

Also due to obstructions such as pillars, conveyers, and other equipment, it is in some cases necessary to break a bus duct line at an intermediate point and to connect around the obstruction. This type of connection in the past has necessitated special fittings. Also connection from the bus duct to the load has many times required the use of special fittings, particularly for connections of switch boards, motor controls and the like.

In accordance with the present invention, many of these difficulties are overcome and a very simple form of end connector is provided which can be used in a wide variety of different service conditions. It will function to connect one line of bus duct to another regardless of whether the bus duct housings are vertical or horizontal, and no matter what the angle. If desired, straight sections of bus duct can be interposed between the connectors of the invention to allow more gradual curving, or to bridge obstructions. The connectors of the invention are particularly adapted for use where a line of bus duct must be broken to connect around structural features or equipment. The end connectors of the invention can also serve as an expansion joint on long lines of bus duct. It is no longer necessary according to the invention to stock in the plant and warehouse a large assortment of odd shaped angles or elbows and it is no longer necessary to provide offset fittings to bridge obstructions. Special expansion joints are no longer needed and special connectors to the load for application to switchboards and motor control centers are not required.

In accordance with the invention a single type of end connector in a limited variety of forms is made to serve all of the different functions. A great deal of time is saved because it is not necessary to make and transmit to the factory precise measurements taken on the job.

Thus the flexibility of the novel connector is a matter of great importance.

It is possible according to the invention to utilize a pair of metallic hoses side by side for connection purposes, and these hoses can be bent sidewise or edgewise as desired. Furthermore in the case where a plurality of hoses are used, very favorable electrical conditions are obtained by carrying one conductor of each phase in each of the metallic hoses. Inductive heating is thus minimized.

The construction is well adapted to stand up under fault. An insulating barrier is desirably provided in the junction boxes which engages and clamps the flexible metallic conductors.

The flexible metallic conductors are held at the ends in a very simple manner, by utilizing hose clamps which carry external recesses into which the junction plates fit.

The usual connector according to the invention consists of two attachment boxes respectively joined to straight bus duct lengths. Each of the attachment boxes desirably connects with a short section of bus duct housing that fills the otherwise open side of the bus duct near the end. Wires carried through the flexible metallic hoses are insulated suitably with varnished cambric and jute, and these wires connect at the ends to the bus bars.

Where connection to a switchboard or the like is to be made it is merely necessary to cut out an opening in the top of the switchboard for one of the junction plates and remove the attachment box at that end.

As illustrated in the drawings, and particularly in Figure 1, we there show the end half-housings 20 and 21 of a bus duct system, omitting the conductors at one end for convenience in illustration. The half-housings are staggered, each comprising a U-bent portion 22 and outer mating flanges 23 which are joined as by bolts 24. The housing half 20 extends longitudinally beyond the housing half 21, but is laterally recessed at 20' at the end and bus bar conductors 25 are exposed for connection each to a terminal 26 of a flexible insulated conductor 27 by means of a bolt 28. Each of the suitably six bus bars 25 is thus connected to one of the terminals 26, there normally being two bus bars for each phase of a three-phase system.

At the end of the bus duct half 20 an attachment box 30 is secured consisting of attachment box halves 31 of U-shaped box formation at the remote end 32 and having cooperating flanges 33 joined together by bolts 34.

At the end adjoining the bus duct each of the attachment box halves has an end closure 35 which is cut out toward the center at 36 to receive the edge portion of the elongated bus duct housing half 20 and the bus bars. The housing half simply has its flanges engaged between the flanges 33 and is held by the bolts 34.

The attachment box has lateral openings 37 which provide access to the bus duct and are suitably closed by covers 38 which are suitably secured in place as by fastening to flange portions 40 on the attachment box halves.

Figure 7:
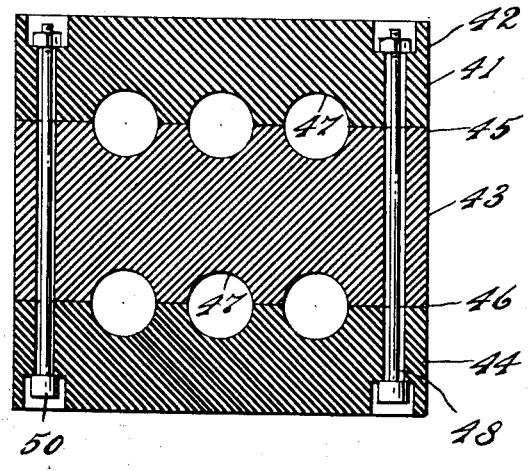
Figure 7 is a section through the insulating clamping plate in accordance with the invention.

At an intermediate point the attachment box receives an insulating clamping partition 41, best seen in Figure 7, consisting of three plate portions 42, 43, and 44 separated along parting lines 45 and 46. Each of the parting lines carries cooperating halves of clamping openings 47 which surround and grip the insulation on the flexible conductors 27 and firmly hold them against the possibility of displacement and damage in case of a fault. Transverse holes 48 extend through the plates and the plates are clamped together and gripped on the flexible conductor insulation by bolts 50.

The insulating partition is free floating and engaged on the conductors.

The outer end of the attachment box has inwardly extending flanges 53 which surround an opening 54 through which the flexible insulated conductors 27 pass.

A junction plate 55 is of square construction and has symmetrically placed openings for bolts 56 so that it can be positioned in any right angle relation as later described. The plate 55 includes two halves 57 which have a central parting line 58 and comprises cooperating half openings 60 which engage rotatable main hose clamps 61 having annular slots 62 which are capable of turning in the inner edges of the openings 60. The hose clamps have screw clamping portions 63 which engage and grip flexible metallic hoses 64. Thus while the hose clamps grip the hose, the hose clamps and hoses together are capable of rotating in the plate 55 during assembly. The halves of the plate 55 are held together by ears 65 secured together by bolts 66 and gripping the hose clamps for grounding purposes.

There are preferably two openings 60, two hose clamps and two hoses in the plate 55.

The hoses carry the insulated flexible conductors 27, there preferably being one conductor of each phase carried through each flexible metallic hose so as to minimize inductive heating. Thus in a three-phase system there will preferably be one conductor of phase A, one conductor of phase B and one conductor of phase C in each of the two hoses.

In one embodiment of the invention, the hoses at the opposite end will connect to a similar arrangement of hoses, clamps and plate 55, and similar attachment box and bus duct. It will be evident, however, that the plate 55 can equally well be fastened to the side or the rear of a switchboard, circuit breaker or other pieces of equipment, and the terminal ends 26 be used for connection to the equipment as previously explained.

Figure 2:
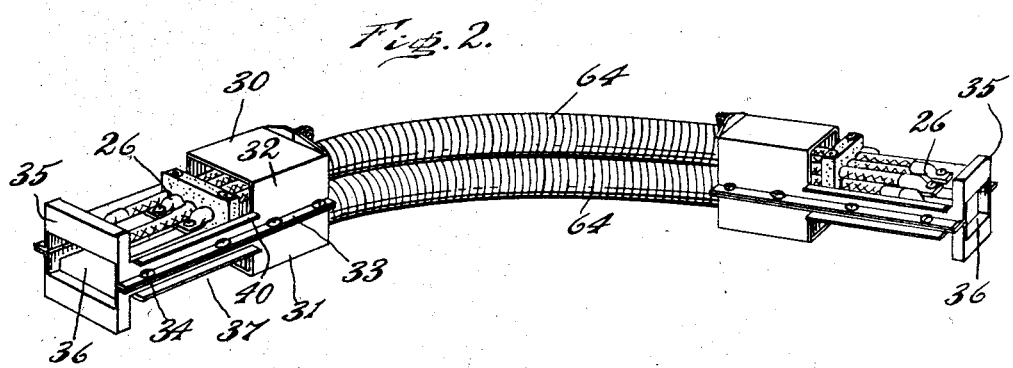
Figure 2 is a view similar to Figure 1 showing a variation.
Figure 3:
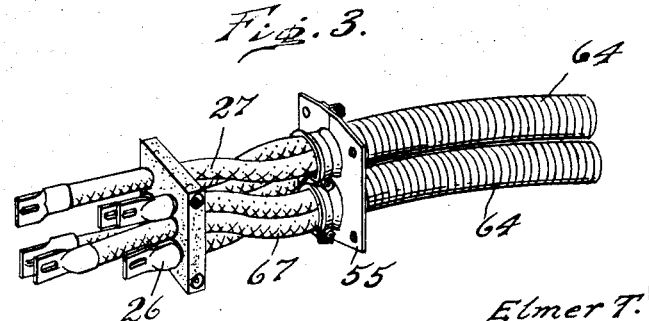
Figure 3 is a fragment of the structure of Figures 1 and 2 omitting the connection box.
Figure 6:
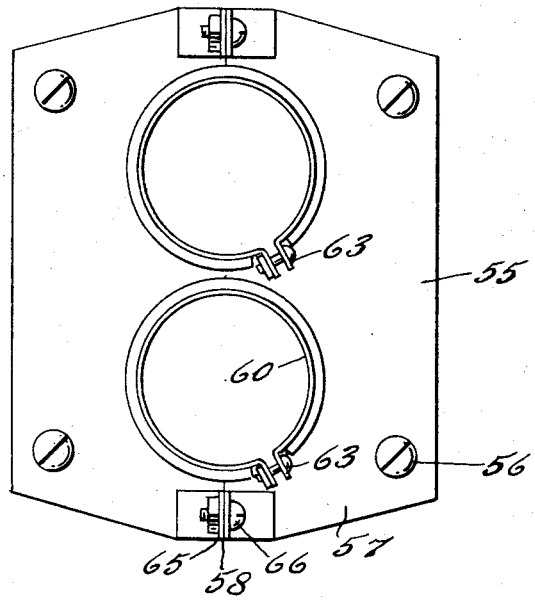
Figure 6 is a detail end elevation of the connection plate to an enlarged scale.

One interesting aspect of the invention is that the arrangement can be provided with the bus duct major lateral axis vertical, as in Figure 1, in which case the hoses 64 are bent on the same radius and are one above another, as shown in Figure 1. On the other hand, the bus ducts can be placed with the major lateral axes horizontal, as shown in Figure 2, and the plate 55 at each end rotated 90° so as to make the hose bend similar to that of Figure 1 with the radii and axes of the hoses the same, or they can be bent on slightly different radii one outside the other, and allowing for difference in hose length. Depending on the way in which the plate 55 and the hoses 64 are positioned with respect to the terminals, the flexible conductors 27 will be bent at 67 to allow for the relative angular positions of the insulating barrier 41 and the plate 55.

In view of our invention and disclosure, variations and modifications to meet individual whim or particular need will doubtless become evident to others skilled in the art to obtain all or part of the benefits of our invention without copying the structure shown and we, therefore, claim all such insofar as they fall within the reasonable spirit and scope of our claims.

Having thus described our invention, what we claim as new and desire to secure by Letters Patent is:

1. In a bus duct system, a pair of bus duct sections each including a plurality of insulated bus duct conductors and housing halves surrounding the conductors, the housing halves being offset longitudinally with respect to one another, an attachment box secured to the adjoining end of each bus duct section and including a housing half covering the open portion of the duct near the end and a box portion at the end, a flexible metallic hose extending from the end of each attachment box to the adjoining end of the other attachment box and flexible metallic conductors extending from the bus duct conductors through the attachment box and through the flexible metallic hose and then through the opposite attacment box and to the opposite bus duct conductors.

2. A bus duct system according to claim 1, in combination with an insulating barrier in the attachment box extending transversely thereto and having openings through which the flexible metallic conductors pass and in which the flexible metallic conductors are engaged and gripped.

3. A bus duct system according to claim 1, in combination with junction plates at the ends of the attachment boxes, each junction plate having a plurality of openings, flexible metallic hoses extending between the respective junction plates and anchored therein, there being a conductor of each phase in each of the flexible metallic hoses.

4. A bus duct system according to claim 3, in which the junction plate is square and adapted to be mounted in any right angle rotational position in the attachment box.

5. In a bus duct system, a bus duct section comprising a housing and a plurality of longitudinally extending insulated bus duct conductors in the housing representing different phases, a first attachment box secured to the housing at one end of the first bus duct section, a plurality of flexible metallic hoses in parallel relation secured at one end to the first attachment box, a second attachment box secured to the opposite ends of the flexible metallic hoses, a second bus duct section comprising a housing and a plurality of longitudinally extending insulated bus duct conductors in the housing representing different phases, the housing of said second bus duct section being secured to the second attachment box, and flexible connecting conductors extending through the metallic hoses, one conductor for each of the different phases being present in each metallic hose, the flexible connecting conductors being connected to the respective bus duct conductors of the first and second bus duct sections.

6. A bus duct system of claim 5, in which the attachment boxes have open ends, in combination with square junction plates secured to the open ends and mounting the ends of the plurality of flexible metallic hose, the junction plates being adapted to be mounted in the attachment boxes at any right angle rotational position, whereby the plurality of flexible metallic hoses have capability of assembly with differing angular positions of the respective bus duct sections.

7. A bus duct system of claim 6, in which the attachment boxes have open ends, and junction plates secured to the open ends and mounting the ends of the plurality of flexible metallic hoses.

References Cited in the file of this patent

UNITED STATES PATENTS

| 1,207,958 | McMurtrie | Dec. 12, 1916 |
| 2,478,204 | O'Brien | Aug. 9, 1949 |